Figure 1:
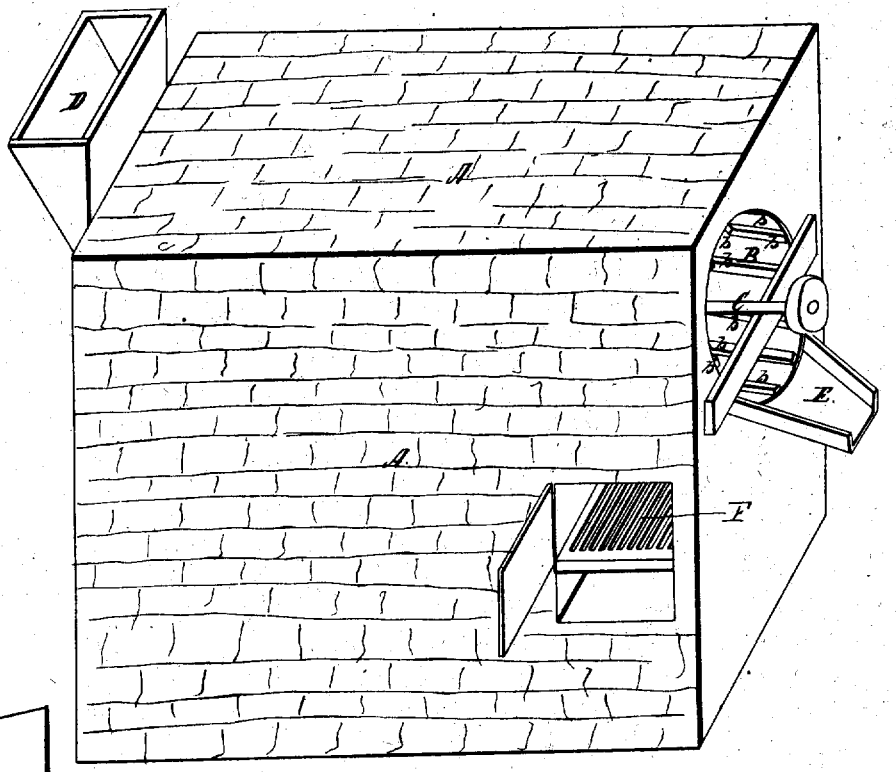
Figure 2:
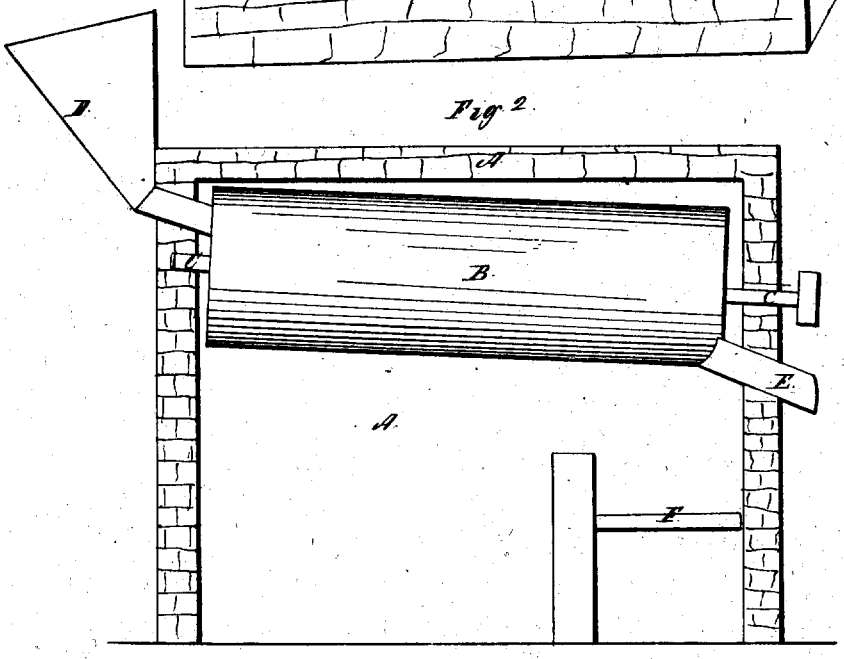
Figure 3:
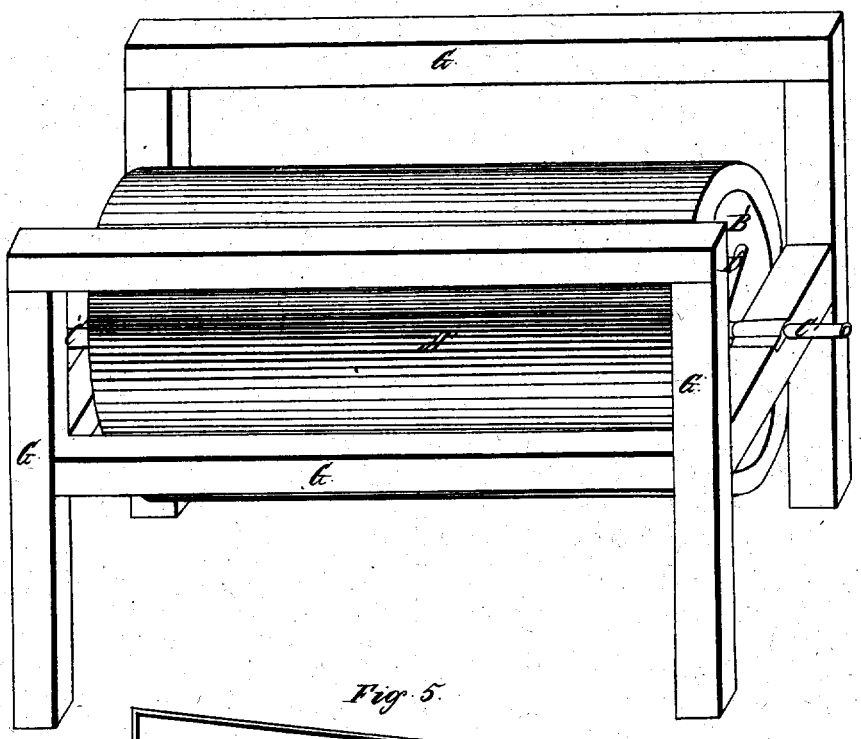
Figure 5:
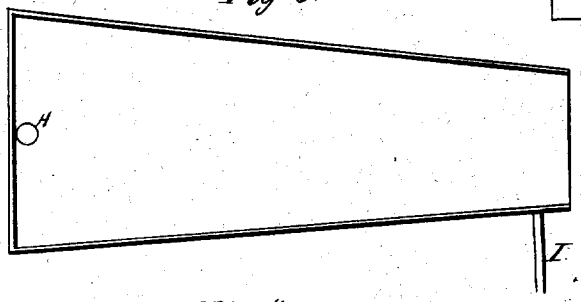
Figure 4:
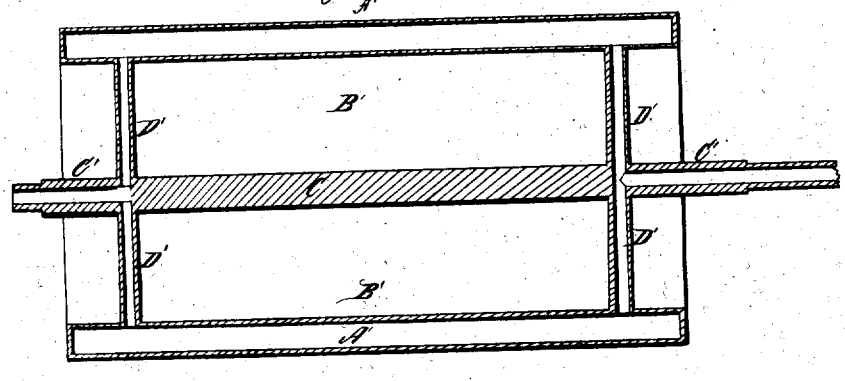

Printed Specification

2 Sheets—Sheet 1.

6685X

N. TYSON.

DRYING FLOUR.

Patented Aug. 3, 1831.

Printed Specification Available
6685X

N. TYSON.
DRYING FLOUR.

Patented Aug. 3, 1831.

Aug. 3, 1831

Nathan Tyson of Baltimore Maryland
Letters Patent.

The Schedule referred to in these Letters Patent and making part of the same containing a description in the words of the said Nathan Tyson himself of his improvement in the mode of kiln drying wheat flour and other kinds of meal by the agency of heated air or of steam operating in an apparatus adapted to the purpose.

To all whom it may concern. Be it known, that I, Nathan Tyson of the City of Baltimore in the State of Maryland, have invented certain improvements on the kiln dryer patented by Oliver Evans on the 29th day of January 1808 as specified by him among certain inventions of improvements in the process of the art of manufacturing grain into flour or meal and for other purposes; by which improvements in the mode of preparing wheat flour, and other kinds of meal, for packing, their tendency to sour, or become otherwise injured by keeping is much decreased, if not altogether obviated, and that the following is a full and exact description of the same. It is a well established fact, that the various species of fermentation which take place in vegetable matter, are not produced by temperature alone, but require the presence of a certain portion of moisture.

The advantages derived from the kiln drying of grain, and of meal depends upon this principle. and my improvement consists in a more effectual and beneficial mode of accomplishing the end proposed, than any of those which have been heretofore adopted.

I take the flour or meal either as it leaves the mill stones, or after it has been submitted to the process of bolting, and cause it to pass through cylindrical or other suitable tubes or boxes, to which a revolving or vibratory motion is to be given, and in which the flour, or meal is subjected to the action of steam, or of heated air. These tubes or boxes may be constructed either of wood or of metal, according to the circumstances, and they may be suspended and moved in the manner of the common bolter. Within the cylinder, or other apparatus containing the flour or meal to be dried, I generally place [illegible]

Drawing

6685X lugs which may stand perpendicularly to said cylinder or other apparatus, and pro-
ject to such height from its inner surface, and have such direction, either par-
allel with, or inclined to, its ends as may appear best calculated, to detain, con-
duct or agitate, the flour, or meal, and expose it for the requisite time to the
influence of the artificial heat employed.

When heated air is used as the drying agent, the cylinder, or box, contain-
ing the flour, or meal, may be made to revolve within a long oven, or kiln,
with the ends of said cylinder open to receive, and deliver the flour or
meal. I sometimes however intend to enclose the cylinder entirely with-
in the oven or kiln, a tube will, in this case pass through the cover to
admit the flour, or meal to be dried, which will then escape through
another tube at the opposite end. When so constructed, the heated air will
not only surround, but be contained within the cylinder or box.

When steam is applied for the purpose of drying the flour, or meal I sur-
round the tube, or box which in this case must be made of metal or oth[illegible]
good conductor, with an exterior case or jacket, with which it revolves,
a sufficient space being allowed between the two, for the passage of the
steam or heated air which is to be admitted from a boiler, or stove prop-
erly conducted, and conveniently situated for that purpose: such connecting
tubes, dampers and valves being attached to the apparatus, as may be requi-
red according to the various modifications of which it is susceptible.

The steam may be admitted through a hollow gudgeon, and allowed to
escape in the same way; there being tubes to conduct it to and from
the space provided for it. Instead of the revolving cylinder or box,
I intend sometimes to construct a cylindrical, or other chamber,
with suitable floors or shelves, one above the other, upon the upper on[illegible]
of which the flour, or meal, may be received, whence it may pass to th[illegible]
below it, being stirred and carried by hopper boys or other suitable
contrivances. Heated air will, in this case, be admitted into the cham-
ber, and have its exit through suitable openings.

For steam, the floors or shelves must be made double, and the steam
pass through them in ways well known to any machinist A current of air, sufficient to carry off the moisture separated from the flour or meal, must in all cases be admitted into the cylinder, or box, in which the flour or meal is contained. In most cases, no particular provision need be made for this purpose, and where this may be requisite, the means of doing it are too obvious to [require] need description.

The drawings deposited in the Patent Office, will serve to illustrate the process and apparatus, herein described, but I do not intend to confine myself to any particular form of construction, or position of the tube or box, or of the other parts, or modifications of the apparatus. A series of convoluted tubes may be employed, a structure like that of the screw of Archimedes, and indeed an almost infinite variety of shapes may be given to the apparatus, all operating upon the same principle, and producing the same effect, with equal or nearly equal advantage.

What I claim as new, and for which I ask a Patent is my improvement in the drying of flour, or meal, either Bolted or unbolted, by means of the application of Steam, or of heated air, in an apparatus constructed in the manner, and upon the principle herein before described.

Witnesses
J. W. [illegible]
J. C. Tyson

Nathan Tyson

J.W.J
(10.68)

(Patented 3d August 1831)